US011219961B2

(12) United States Patent
Mitsuyasu et al.

(10) Patent No.: US 11,219,961 B2
(45) Date of Patent: Jan. 11, 2022

(54) WIRE ELECTRICAL DISCHARGE MACHINING SYSTEM, WIRE ELECTRICAL DISCHARGE MACHINING METHOD, AND WORKPIECE MEASUREMENT METHOD

(71) Applicant: Seibu Electric & Machinery Co., Ltd., Fukuoka (JP)

(72) Inventors: Takashi Mitsuyasu, Fukuoka (JP); Yoshihiro Ito, Fukuoka (JP); Takayasu Sakatani, Fukuoka (JP); Hiroaki Fujii, Fukuoka (JP)

(73) Assignee: Seibu Electric & Machinery Co., Ltd., Fukuoka (JP)

( * ) Notice: Subject to any disclaimer, the term of this patent is extended or adjusted under 35 U.S.C. 154(b) by 250 days.

(21) Appl. No.: 16/131,510

(22) Filed: Sep. 14, 2018

(65) Prior Publication Data
US 2019/0022780 A1     Jan. 24, 2019

Related U.S. Application Data

(63) Continuation of application No. 16/080,204, filed as application No. PCT/JP2018/003316 on Jan. 31, 2018.

(30) Foreign Application Priority Data

Jul. 20, 2017   (JP) .............................. JP2017-141166

(51) Int. Cl.
*B23H 7/08*     (2006.01)
*B23H 7/06*     (2006.01)
*B23H 7/20*     (2006.01)

(52) U.S. Cl.
CPC ................ *B23H 7/08* (2013.01); *B23H 7/06* (2013.01); *B23H 7/20* (2013.01); *B23H 2500/20* (2013.01)

(58) Field of Classification Search
CPC ........ B23H 2500/20; B23H 7/06; B23H 7/08; B23H 7/20; G05B 2219/45043
(Continued)

(56) References Cited

U.S. PATENT DOCUMENTS

2013/0282328 A1* 10/2013 Sato ................... B23Q 17/2291
                                                            702/150
2014/0236341 A1*  8/2014 Nishikawa ............. B23H 7/065
                                                            700/162

(Continued)

FOREIGN PATENT DOCUMENTS

EP      2767360 A2    8/2014
EP      2862659 A1    4/2015
(Continued)

OTHER PUBLICATIONS

Chinese Office Action dated Jan. 17, 2020 issued in the corresponding Chinese application No. 201811220471.8 with its English translation.
(Continued)

*Primary Examiner* — Justin C Dodson
*Assistant Examiner* — Dilnessa B Belay
(74) *Attorney, Agent, or Firm* — Rankin, Hill & Clark LLP

(57) ABSTRACT

It is a purpose of the present invention to provide a wire electrical discharge machining system allowing a wire electrical discharge machining device and a robot to operate in conjunction with each other with high efficiency. A wire electrical discharge machining system 1 includes wire electrical discharge machining devices 7, 11, and 15, and a robot unit 17 that mounts a workpiece on the wire electrical discharge machining device. The wire electrical discharge machining devices 7, 11, and 15 may each perform either rough machining with supported cores or finishing machin-
(Continued)

ing after the cores are removed. Subsequently, core processing may be performed by means of a corresponding dedicated apparatus. Also, the core processing may be performed by means of a single common apparatus. The robot unit 17 mounts and collects the workpiece so as to allow these wire electrical discharge machining apparatuses to effectively operate, thereby providing wire electrical discharge machining with improved efficiency for the overall system.

6 Claims, 4 Drawing Sheets

(58) Field of Classification Search
USPC ...................................................... 219/69.12
See application file for complete search history.

(56) References Cited

U.S. PATENT DOCUMENTS

| 2014/0374385 | A1 | 12/2014 | Kawano | |
|---|---|---|---|---|
| 2017/0087656 | A1* | 3/2017 | Hasegawa | ................ B23H 7/20 |

FOREIGN PATENT DOCUMENTS

| JP | 58160018 | A2 | | 9/1983 | |
|---|---|---|---|---|---|
| JP | 02284822 | | | 11/1990 | |
| JP | 04171111 | | | 6/1992 | |
| JP | 0780725 | | | 3/1995 | |
| JP | 09220685 | | | 8/1997 | |
| JP | 2006289541 | A2 | | 10/2006 | |
| JP | 2013215830 | A | * | 10/2013 | |
| JP | 2014159055 | A2 | | 9/2014 | |
| JP | 5913751 | B1 | | 4/2016 | |
| JP | 2017113842 | A2 | | 6/2017 | |
| WO | 2013187201 | A1 | | 12/2013 | |
| WO | 2015132987 | A1 | | 9/2015 | |
| WO | 2016132973 | A1 | | 8/2016 | |
| WO | WO-2017208336 | A1 | * | 12/2017 | ............... B23H 7/10 |

OTHER PUBLICATIONS

International Search Report dated Apr. 3, 2018 filed in PCT/JP2018/003316.
Chinese Office Action dated Dec. 4, 2019 issued in the corresponding Chinese patent application No. 201880000965.7 and its English translation.

* cited by examiner (a)

(b)

(a)

(b)

WIRE ELECTRICAL DISCHARGE MACHINING SYSTEM, WIRE ELECTRICAL DISCHARGE MACHINING METHOD, AND WORKPIECE MEASUREMENT METHOD

TECHNICAL FIELD

The present invention relates to a wire electrical discharge machining system, a wire electrical discharge machining method, and a workpiece measurement method, and particularly to a wire electrical discharge machining system or the like including a wire electrical discharge machining device configured to machine a workpiece.

BACKGROUND ART

In Patent document 1, an arrangement is described in which a robot supports an operation such as replacement of a target workpiece on a wire electrical discharge machining device.

It should be noted that, as disclosed in Patent document 2, for example, the applicant has proposed a technique in which, in a wire discharge machining operation, a core is welded in the wire electric discharge machining, and the welded core is automatically removed and collected.

CITATION LIST

Patent Literature

[Patent Document 1]
Japanese Patent Application Laid Open No. 2017-113842
[Patent Document 2]
Japanese Patent No. 5,913,751

SUMMARY OF INVENTION

Technical Problem

In Patent document 1, the wire electrical discharge machining device cuts off a processed article from a target workpiece such that it falls into a workpiece reservoir. The robot detects the processed article that has fallen into the workpiece reservoir by means of a vision sensor and collects the processed article thus detected. This requires the robot to operate for a very long period of time.

Accordingly, it is a purpose of the present invention to provide a wire electrical discharge machining system or the like that is capable of allowing a wire electrical discharge machining device and a robot to operate in conjunction with each other with high efficiency.

Solution of Problem

A first aspect of the present invention relates to a wire electrical discharge machining system comprising a first wire electrical discharge machining device configured to machine a workpiece, wherein the first wire electrical discharge machining device comprises: a first electrical discharge machining unit configured to perform electrical discharge machining of a workpiece in a state in which a core is supported in a first operation; and a core collecting unit configured to remove and collect the core supported by the workpiece by means of the first operation, wherein the wire electrical discharge machining system further comprises: a second wire electrical discharge machining device; a core processing apparatus; and a robot unit, wherein the second wire electrical discharge machining device comprises a second electrical discharge machining unit configured to perform electrical discharge machining of a workpiece in a state in which a core is supported by means of a second operation that differs from the first operation, wherein the robot unit collects the workpiece with the core supported by means of the second operation from the second wire electrical discharge machining device, and mounts the workpiece on the core processing apparatus, and wherein the core processing apparatus removes and collects the core thus supported by the workpiece by means of the second operation.

A second aspect of the present invention relates to the wire electrical discharge machining system according to the first aspect, wherein, in a case in which a core is to be removed and collected by the core collecting unit, electrical discharge machining of the workpiece is performed in a state in which a core is supported by means of the first operation, and wherein, in a case in which a core is to be removed and collected by the core processing apparatus, electrical discharge machining of the workpiece is performed in a state in which a core is supported by means of the second operation.

A third aspect of the present invention relates to the wire electrical discharge machining system according to the first aspect, wherein a degree to which the core is supported by the workpiece by means of the second operation is stronger than a degree to which the core is supported by the workpiece by means of the first operation.

A fourth aspect of the present invention relates to the wire electrical discharge machining system according to the first aspect, wherein, in the second operation, the core is supported by the workpiece via a pre-machining remaining portion, and wherein, in the first operation, the core is supported by the workpiece without involving a pre-machining remaining portion.

A fifth aspect of the present invention relates to the wire electrical discharge machining system according to the first aspect, wherein the workpiece is a combined workpiece configured as a stack of a plurality of work plates, wherein, in the second operation, a part of or otherwise all of cores in one or more intermediate layers are each bonded beforehand to an adjacent core, and wherein, in the second operation, the cores are supported by at least an uppermost work plate or otherwise a lowermost work plate.

A sixth aspect of the present invention relates to the wire electrical discharge machining system according to the first aspect, wherein the first wire electrical discharge machining device comprises a position measurement unit configured to measure a position of the mounted workpiece, wherein, when the position measurement unit detects a tilt that is larger than a reference value, the robot unit corrects the position at which the workpiece is mounted on the wire electrical discharge machining device, and wherein, when the position measurement unit detects a tilt that is smaller than a reference value, the electrical discharge machining unit adjusts a reference plane in machining.

A seventh aspect of the present invention relates to the wire electrical discharge machining system according to the first aspect, wherein the first wire electrical discharge machining device comprises a position measurement unit configured to measure a position of a mounted workpiece, wherein the position measurement unit can be retracted, wherein the first electrical discharge machining unit machines a predetermined measurement portion on the workpiece and/or at a position that differs from the workpiece by means of a wire, and wherein, after the position measurement unit is extruded from a retracted position, the position measurement unit measures one or multiple predetermined measurement points formed in the predetermined measurement portion, so as to correct a measurement operation of the position measurement unit, and so as to correct a position of the wire.

An eighth aspect of the present invention relates to a wire electrical discharge machining system comprising a wire electrical discharge machining device configured to machine a workpiece, wherein the wire electrical discharge machining device comprises: an electrical discharge machining unit configured to perform electrical discharge machining of the workpiece in a state in which a core is supported by the workpiece; and a core removing unit configured to remove and collect the core supported by the workpiece, wherein the wire electrical discharge machining system further comprises: a core processing apparatus configured to remove and collect the core supported by the workpiece; and a robot unit configured to mount the workpiece on the wire electrical discharge machining device, wherein determination is made whether or not the core is to be removed and collected by the core removing unit, wherein, when determination is made that the core is not to be removed and collected by the core removing unit, the electrical discharge machining unit performs a first operation so as to provide a state in which a core is supported by the workpiece, the robot unit collects the workpiece with the core after the electrical discharge machining, and mounts the workpiece with the core on the core processing apparatus, and the core processing apparatus removes and collects the core, wherein, when determination is made that the core is to be removed and collected by the core removing unit, the electrical discharge machining unit performs a second operation that differs from the first operation, so as to provide a state in which a core is supported by the workpiece, the core removing unit removes and collects the core, and the robot unit collects the workpiece from the wire electrical discharge machining device after the core is removed.

A ninth aspect of the present invention relates to the wire electrical discharge machining system according to the eighth aspect, wherein, in a case in which the core is not to be removed and collected by means of the core removing unit, the electrical discharge machining unit performs machining so as to provide a pre-machining remaining portion, thereby allowing electric discharge machining to be performed with the core supported via the pre-machining remaining portion, and wherein, in a case in which the core is to be removed and collected by means of the core removing unit, the electrical discharge machining unit performs electrical discharge machining with the core supported by means of an operation that differs from the operation that provides the pre-machining remaining portion.

A tenth aspect of the present invention relates to the wire electrical discharge machining system according to the eighth or ninth aspect, wherein the wire electrical discharge machining system comprises a plurality of the wire electrical discharge machining devices, wherein a part of or otherwise all of the wire electrical discharge machining devices each comprise the electrical discharge machining unit and the core removing unit, wherein the core removing unit removes and collects the core from the workpiece with the core supported in electrical discharge machining provided by the electrical discharge machining unit included in the same electrical discharge machining device, and wherein the core processing apparatus removes and collects the core from the workpiece with the core supported in electrical discharge machining provided by a plurality of electrical discharge machining devices.

An eleventh aspect of the present invention relates to the wire electrical discharge machining system according to any one of the eighth through tenth aspects, wherein, in a case in which the core is to be removed and collected by means of the core removing unit, the electrical discharge machining unit of the wire electrical discharge machining device performs rough machining of the workpiece with the core supported by means of the first operation, the core removing unit of the wire electrical discharge machining device removes and collects the core from the workpiece, the electrical discharge machining unit of the wire electrical discharge machining device performs finishing machining of the workpiece after the core is removed, and the robot unit collects the workpiece after the core is removed, and wherein, in a case in which the core is not to be removed and collected by means of the core removing unit, the electrical discharge machining unit of the wire electrical discharge machining device performs rough machining of the workpiece with the core supported by means of the second operation, the robot unit collects the workpiece with the core after electrical discharge machining, the core processing apparatus removes and collects the core from the workpiece with the core, after the core is removed, the robot unit mounts the workpiece on a wire electrical discharge machining device that differs from the wire electrical discharge machining device that has performed the second operation, and the electrical discharge machining unit of the wire electrical discharge machining device on which the workpiece has been mounted after the core has been removed performs finishing machining of the workpiece thus mounted.

An twelfth aspect of the present invention relates to the wire electrical discharge machining system according to any one of the eighth through eleventh aspects, wherein the core is supported by the workpiece in electrical discharge machining by means of at least one from among: a structure provided with a pre-machining remaining portion; a structure in which the core is bonded; and a structure in which a core in an intermediate layer is bonded to an adjacent core beforehand and at least one of the bonded cores is supported by the workpiece.

A thirteenth aspect of the present invention relates to a wire electrical discharge machining method employed in a wire electrical discharge machining system, wherein the wire electrical discharge machining system comprises: a wire electrical discharge machining device; a core processing apparatus; and a robot unit, wherein the wire electrical discharge machining device comprises: an electrical discharge machining unit configured to perform electrical discharge machining of a workpiece in a state in which a core is supported by the workpiece; and a core collecting unit configured to remove and collect the core supported by the workpiece, wherein the core processing apparatus is configured to remove and collect the core supported by the workpiece, wherein, in a case in which the core is to be removed and collected by means of the core collecting unit, electrical discharge machining of the workpiece is performed in a state in which the core is supported by means of a first operation, and the core collecting unit removes and collects the core, wherein, in a case in which the core is to be removed and collected by means of the core processing apparatus, the electrical discharge machining unit performs electrical discharge machining of the workpiece in a state in which the core is supported by means of a second operation that differs from the first operation, wherein, in a case in which the core is to be removed and collected by means of the core collecting unit, the robot unit collects the workpiece from the wire electrical discharge machining device after the core is removed, and wherein, in a case in which the core is to be removed and collected by means of the core processing apparatus, the robot unit collects the workpiece with the core from the wire electrical discharge machining device, and mounts the workpiece on the core processing apparatus.

A fourteenth aspect of the present invention relates to a wire electrical discharge machining method employed in a wire electrical discharge machining system, wherein the wire electrical discharge machining system comprises: a wire electrical discharge machining device configured to perform electrical discharge machining of a workpiece in a state in which a core is supported by the workpiece; a core processing apparatus configured to remove and collect the core supported by the workpiece; and a robot unit configured to mount the workpiece on the wire electrical discharge machining device, wherein the electrical discharge machining device comprises: an electrical discharge machining unit configured to perform electrical discharge machining of a workpiece in a state in which a core is supported by the workpiece; and a core removing unit configured to remove and collect the core supported by the workpiece, wherein the wire electrical discharge machining method comprises: determining whether or not the core is to be removed and collected by the core removing unit, if determination is made that the core is not to be removed and collected by the core removing unit, performing a first operation, by the electrical discharge machining unit, so as to provide a state in which the core is supported by the workpiece; collecting the workpiece with the core, by the robot unit, after electrical discharge machining; mounting the workpiece with the core, by the robot unit, on the core processing apparatus; and removing and collecting the core by the core processing apparatus, and if determination is made that the core is to be removed and collected by the core removing unit, performing a second operation that differs from the first operation, by the electrical discharge machining unit, so as to provide a state in which the core is supported by the workpiece; removing and collecting the core by the core removing unit; and collecting the workpiece, by the robot unit, from the wire electrical discharge machining device after the core is removed.

A fifteenth aspect of the present invention relates to a wire electrical discharge machining method employed in a wire electrical discharge machining system, wherein the wire electrical discharge machining system comprises: a plurality of wire electrical discharge machining devices each configured to perform electrical discharge machining of a workpiece in a state in which a core is supported by the workpiece; a core processing apparatus configured to remove and collect the core supported by the workpiece; and a robot unit configured to mount the workpiece on the wire electrical discharge machining device, wherein a part of or otherwise all of the electrical discharge machining devices each comprise: an electrical discharge machining unit configured to perform electrical discharge machining of the workpiece in a state in which a core is supported by the workpiece; and a core removing unit configured to remove and to collect the core supported by the workpiece, wherein the core removing unit removes and collects the core from the corresponding workpiece with the core that has been supported in electrical discharge machining provided by the electrical discharge machining unit included in the same wire electrical discharge machining device, wherein the core processing apparatus removes and collects the core from the workpiece with the core supported in electrical discharge machining provided by the plurality of the wire electrical discharge machining devices, wherein the wire electrical discharge machining method comprises: determining whether or not the core is to be removed and collected by means of the core removing unit, if determination is made that the core is not to be removed and collected by the core removing unit, providing, by the electrical discharge machining unit, a state in which the core is supported by the workpiece; collecting the workpiece with the core, by the robot unit, after electrical discharge machining; mounting the workpiece with the core, by the robot unit, on the core processing apparatus; and removing and collecting the core by the core processing apparatus, and if determination is made that the core is to be removed and collected by the core removing unit, providing, by the electrical discharge machining unit, a state in which the core is supported by the workpiece; removing and collecting the core by the core removing unit; and collecting the workpiece, by the robot unit, from the wire electrical discharge machining device after the core is removed.

A sixteenth aspect of the present invention relates to a workpiece measurement method employed in a wire electrical discharge machining device configured to machine a workpiece, wherein the wire electrical discharge machining device comprises: a position measurement unit configured to measure a position of a mounted workpiece; and an electrical discharge machining unit configured to perform electrical discharge machining of the workpiece, wherein the position measurement unit can be retracted, wherein the workpiece measurement method comprises: machining, using a wire, by means of the electrical discharge machining unit, a predetermined measurement portion on the workpiece and/or at a position that differs from the workpiece; and measuring one or otherwise a plurality of predetermined measurement points formed in the predetermined measurement portion after the position measurement unit is extruded from a retracted position, so as to correct a measurement operation of the position measurement unit, and so as to correct a position of the wire.

In this case, the cores may preferably be supported in the wire electrical discharge machining such that they can be removed and collected by means of the wire electrical discharge machining device or otherwise the core processing apparatus. For example, in the electrical discharge machining, after the core is cut off along the entire circumference thereof, one or otherwise multiple portions thereof are welded such that the core is supported by the workpiece. Also, the core may be cut off along a major part of the entire circumference thereof such that the core is supported by the workpiece via the remaining pre-machining portion.

Advantageous Effects of Invention

With each aspect of the present invention, the wire electrical discharge machining device performs wire electrical discharge machining in a state in which cores are supported. This arrangement is configured such that each core does not fall into the workpiece reservoir in the electrical discharge machining. Accordingly, the robot unit is not required to collect the cores from the workpiece reservoir. Instead, the core processing apparatus or the like may intensively perform such an operation in which the cores are removed and collected.

The present applicant has disclosed techniques as described in Patent document 2, for example, in which a core is supported in the wire electrical discharge machining, and the core is automatically removed and collected. The present invention supports a combination of an operation in which each wire electrical discharge machining device individually performs the core processing and collects its workpiece and an operation in which the core processing apparatus or the like intensively performs the core processing instead of the operation in which each wire electrical machining device performs the core processing. As described above, by allowing each workpiece to be mounted and collected by means of the robot unit, this arrangement provides effective wire electrical discharge machining in an organized manner overall.

Furthermore, with the present invention, the workpiece is configured as a stack of multiple work plates. The wire electrical discharge machining device performs electrical discharge machining in a state in which a core is supported by the lowermost work plate, for example. This allows cores to be supported by the multiple work plates via a necessary minimum support portion. Also, in a case in which the core processing is not performed in the wire electrical discharge machining device, a core may be supported by the uppermost layer and the lowermost layer of the work plates. This allows the workpiece to be collected in a state in which the cores are supported in a stable manner.

Furthermore, with the present invention, the wire electrical discharge machining device measures the position of the mounted workpiece, and corrects the machining operation based on the measurement results. This allows the machining operation to be performed according to the mounted state provided by the robot unit.

DESCRIPTION OF EMBODIMENTS

Description will be made below with reference to the drawings regarding an example of the present invention. It should be noted that an embodiment of the present invention is not restricted to the following examples.

Example 1

Figure 1:
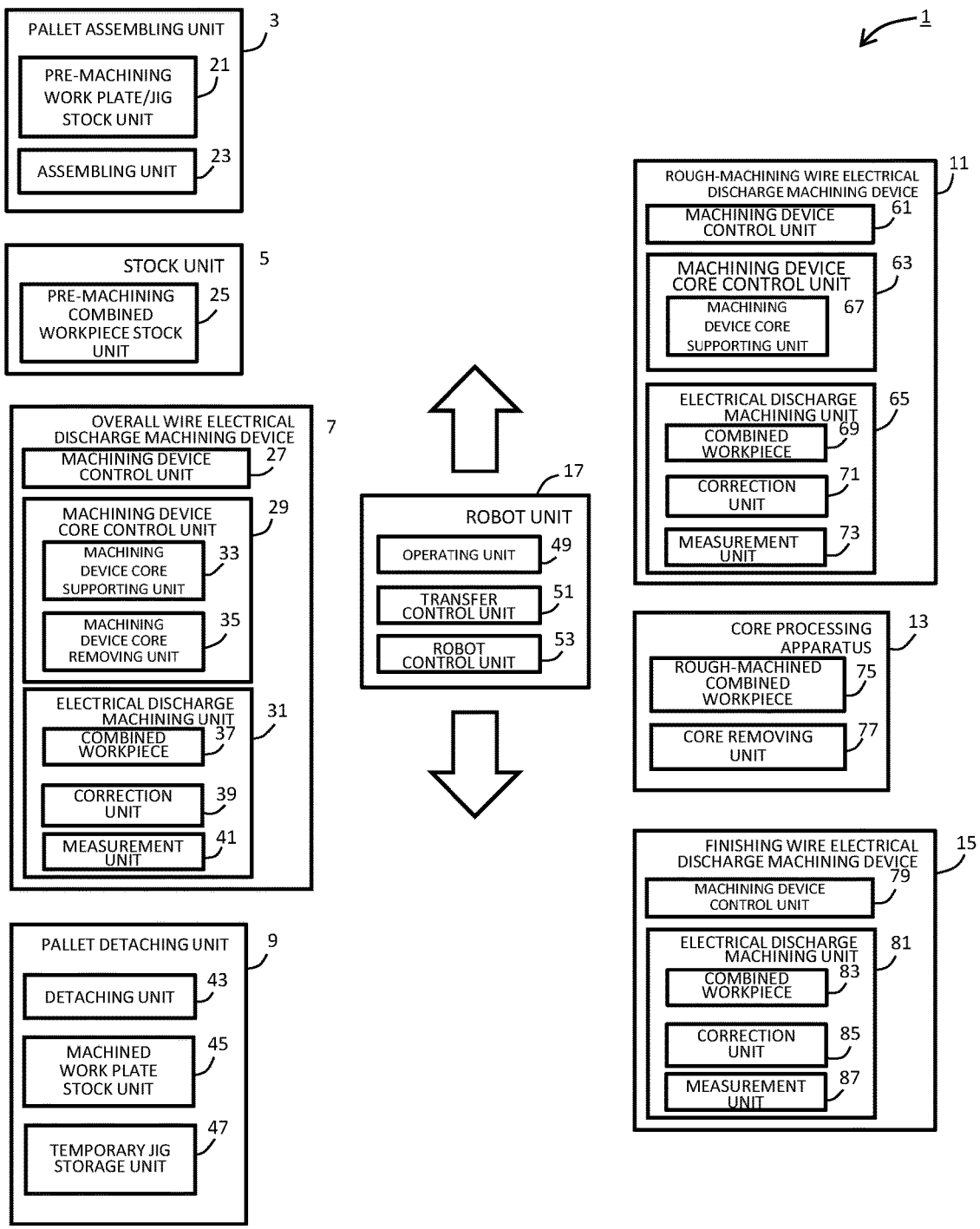
FIG. 1 is a block diagram showing an example of a configuration of a wire electrical discharge machining system 1 according to an embodiment of the present invention.
Figure 2:
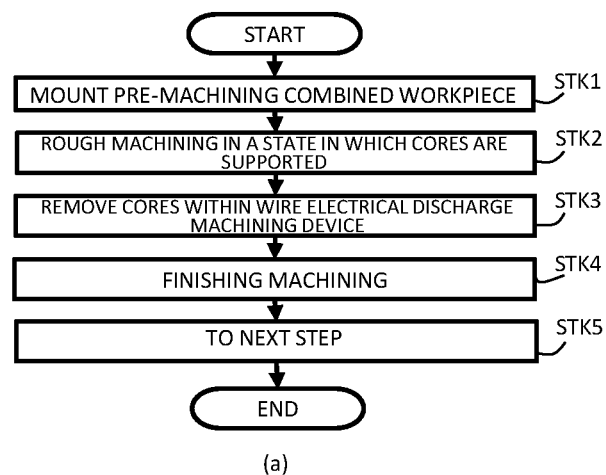
FIG. 2 is a flowchart showing an example of the operation of the wire electrical discharge machining system 1 shown in FIG. 1.
Figure 2:
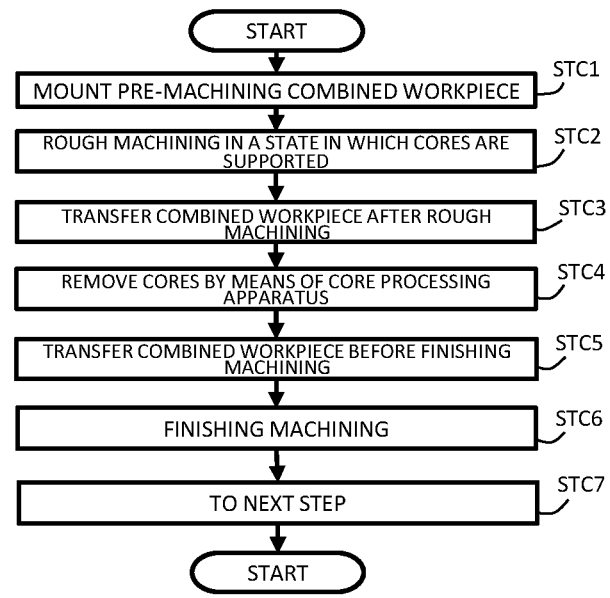

FIG. 1 is a block diagram showing an example of a configuration of a wire electrical discharge machining system 1 according to an embodiment of the present invention. FIG. 2 is a flowchart showing an example of the operation of the wire electrical discharge machining system 1 shown in FIG. 1.

The wire electrical discharge machining system 1 includes a pallet assembling unit 3, a stock unit 5, an overall wire electrical discharge machining device 7 (an example of the "first wire electrical discharge machining device" in the present invention), a pallet detaching unit 9, a rough-machining wire electrical discharge machining device (an example of the "second wire electrical discharge machining device" in the present invention), a core processing apparatus 13 (an example of the "core processing apparatus" in the present invention), and a finishing wire electrical discharge machining device 15.

The pallet assembling unit 3 includes a pre-machining work plate/jig stock unit 21 and an assembling unit 23. The stock unit 5 includes a pre-machining workpiece stock unit 25. The overall wire electrical discharge machining device 7 includes a machining device control unit 27, a machining device core control unit 29, and an electrical discharge machining unit 31 (an example of the "first electrical discharge machining unit" in the present invention). The machining device core control unit 29 includes a machining device core supporting unit 33 and a machining device core removing unit 35 (an example of the "core collecting unit" in the present invention). The electrical discharge machining unit 31 includes a combined workpiece 37, a correction unit 39, and a measurement unit 41. The pallet detaching unit 9 includes a detaching unit 43, a machined work plate stock unit 45, and a temporary jig storage unit 47.

A robot unit 17 (an example of the "robot unit" in the present invention) includes an operating unit 49, a transfer control unit 51, and a robot control unit 53. The rough-machining wire electrical discharge machining device 11 includes a machining device control unit 61, a machining device core control unit 63, an electrical discharge machining unit 65 (an example of the "second electrical discharge machining unit" in the present invention). The machining device core control unit 63 includes a machining device core supporting unit 67. The electrical discharge machining unit 65 includes a combined workpiece 69, a correction unit 71, and a measurement unit 73. The core processing unit 13 includes a rough-machined combined workpiece 75 and a core removing unit 77. The finishing wire electrical discharge machining device 15 includes a machining device control unit 79 and an electrical discharge machining unit 81. The electrical discharge machining unit 81 includes a combined workpiece 83, a correction unit 85, and a measurement unit 87.

Description will be made with reference to FIG. 2A regarding an example of the operation using the overall wire electrical discharge machining device 7. In this case, the overall wire electrical discharge machining device 7 performs rough machining in a state in which a core is supported, removal and collection of a core, and finishing machining.

In the pallet assembling unit 3, the pre-machining work plate/jig stock unit 21 temporarily stores multiple work plates and jigs. The assembling unit 23 stacks the multiple work plates stocked in the pre-machining work plate/jig stock unit 21, and fixes the stacked work plates by means of a jig such as a frame member such that it surrounds the outer faces of the work plates, for example. This provides a combined workpiece to be machined by the overall wire electrical discharge machining device 7, the rough-machining wire electrical discharge machining device 11, and the finishing wire electrical discharge machining device 15. For simplicity, description will be made assuming that the combined workpiece is configured as a stack of three work plates.

When the number of the combined workpieces becomes a predetermined number or more in the pallet assembling unit 3, the transfer control unit 51 of the robot unit 17 transfers the robot unit 17 to the pallet assembling unit 3. The operating unit 49 configured as a robot arm or the like collects the multiple combined workpieces assembled by the assembling unit 23. The transfer control unit 51 transfers the robot unit 17 to the stock unit 5, and stocks the multiple workpieces thus collected in the pre-machining combined workpiece stock unit 25 of the stock unit 5.

The robot unit 17 mounts one from among the combined workpieces, which have been stocked in the pre-machining combined workpiece stock unit 25 of the stock unit 5, on the electrical discharge machining unit 31 of the overall wire electrical discharge machining device 7 (Step STK1). The combined workpiece 37 included in the electrical discharge machining unit 31 is the combined workpiece thus mounted.

In the overall wire electrical discharge machining device 7, the measurement unit 41 measures the position of the combined workpieces 37. Based on the measurement result for the combined workpiece 37, the correction unit 39 corrects the position of the combined workpiece or otherwise adjusts the machining operation of the electrical discharge machining unit 31.

Figure 3:
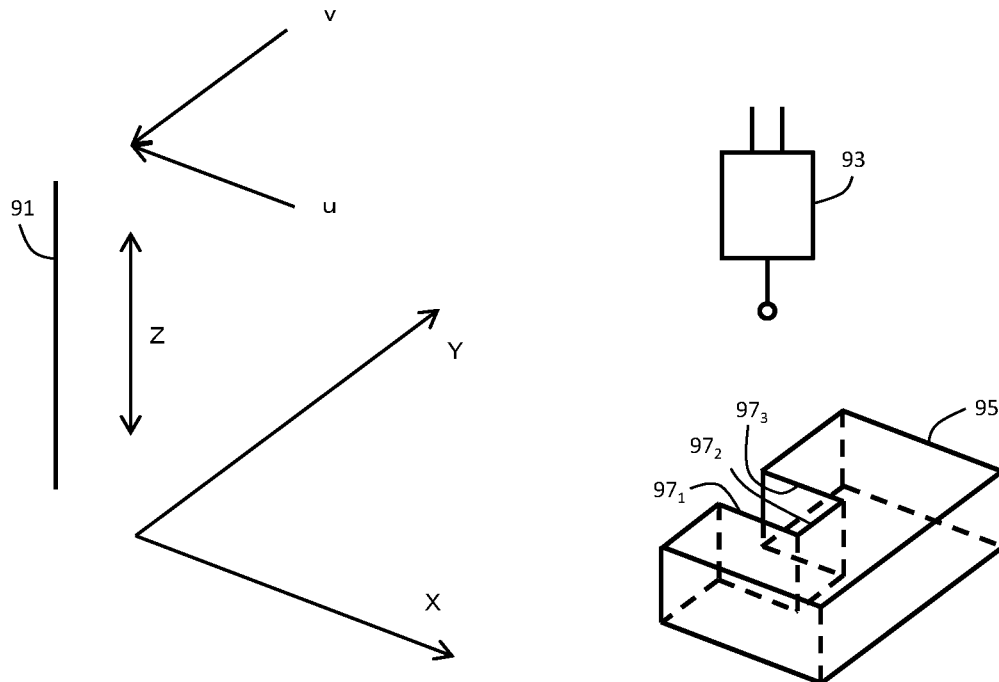
FIG. 3 is a diagram showing an example of the operations of the correction unit and the measurement unit of the electrical discharge machining unit shown in FIG. 1.
Figure 3:
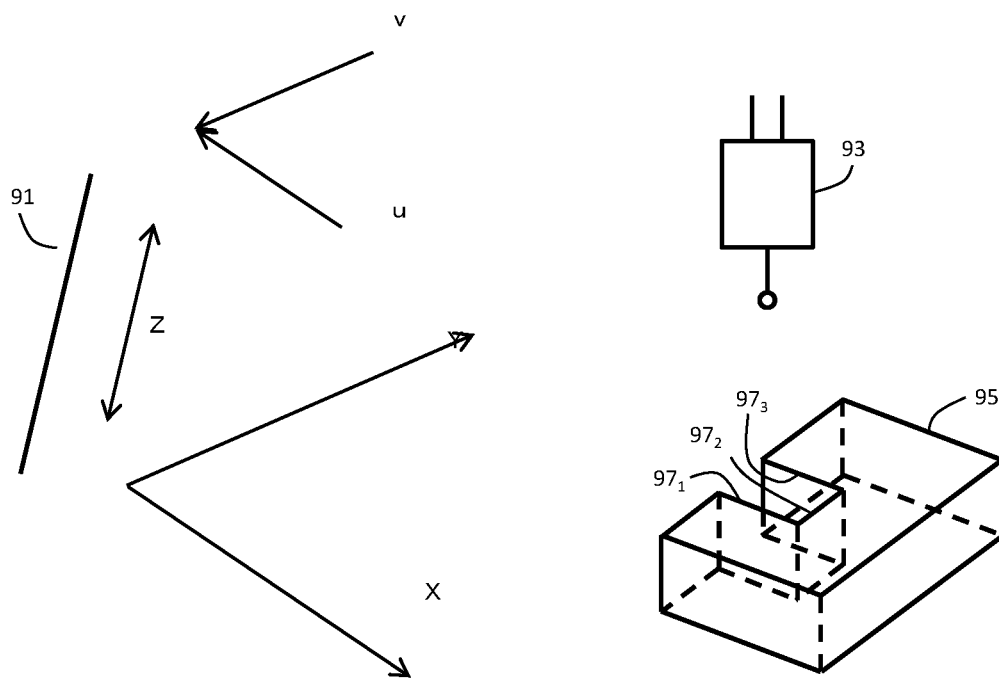

Specific description will be made with reference to FIG. 3 regarding an example of the operations of the measurement unit 41 and the correction unit 39. In principle, the XY plane is defined such that it extends in the horizontal direction. The Z axis is defined such that it extends in the vertical direction. The uv plane is defined such that it extends in the horizontal direction. In a case in which a wire 91 included in the electrical discharge machining unit 31 is arranged along the Z axis, an upper head and a lower head may preferably be arranged at an upper position and a lower position along the vertical direction.

A touch probe 93 is configured as an example of the measurement unit 41. Before the start of the wire electrical discharge machining of the combined workpiece 37, the electrical discharge machining unit 31 performs electrical discharge machining of a measurement target 95 provided as a member separate from the combined workpiece 37, thereby providing a preliminary measurement target portion 97. The touch probe 93 can be retracted into a housing unit. When the combined workpiece 37 is to be measured, the touch probe 93 is extruded from the housing unit, following which the combined workpiece 37 is measured by means of the touch probe 93. In some cases, this leads to a reduction in the measurement precision. In order to solve such a problem, at the timing at which the touch probe 93 is extruded from the housing unit, the touch probe 93 measures the preliminary measurement target portion 97 so as to estimate the position of the touch probe 93. At the same time, the position of the wire 91 is calculated so as to provide recalibration. Subsequently, the combined workpiece 37 is measured.

When the touch probe 93 detects that the tilt of the combined workpiece 37 is an angle that is equal to or larger than a reference value, the position at which the combined workpiece 37 has been mounted is adjusted by means of the operating unit 49 of the robot unit 17. When the tilt is smaller than the reference value, the correction unit 39 moves the uv plane according to the deviation such that the longitudinal axis (vertical axis) of the wire 91 is orthogonal to the reference plane of the combined workpiece 37. This correction allows the wire electrical discharge machining device to perform fine machining according to the tilt or the position of the combined workpiece 37 mounted on the wire electrical discharge machining device.

It should be noted that such a preliminary measurement target portion 97 may be provided to the combined workpiece (work plate and/or jig). The preliminary measurement target portion 97 may be machined at a timing at which the combined workpiece is mounted on the electrical discharge machining unit, following which the correction may be performed.

The machining device core supporting unit 33 performs an operation in which the cores are supported, so as to allow the electrical discharge machining unit 31 to perform rough machining of the combined workpiece 37 (Step STK2 in FIG. 2A). In a case in which the cores are to be removed and collected by means of the machining device core removing unit 35, electrical discharge machining is performed by means of the electrical discharge machining unit 31 in a state in which the cores are supported by means of a first operation. On the other hand, in a case in which the cores are to be removed and collected by means of the core processing apparatus 13, electrical discharge machining is performed in a state in which the cores are supported by means of a second operation that differs from the first operation.

Figure 4:
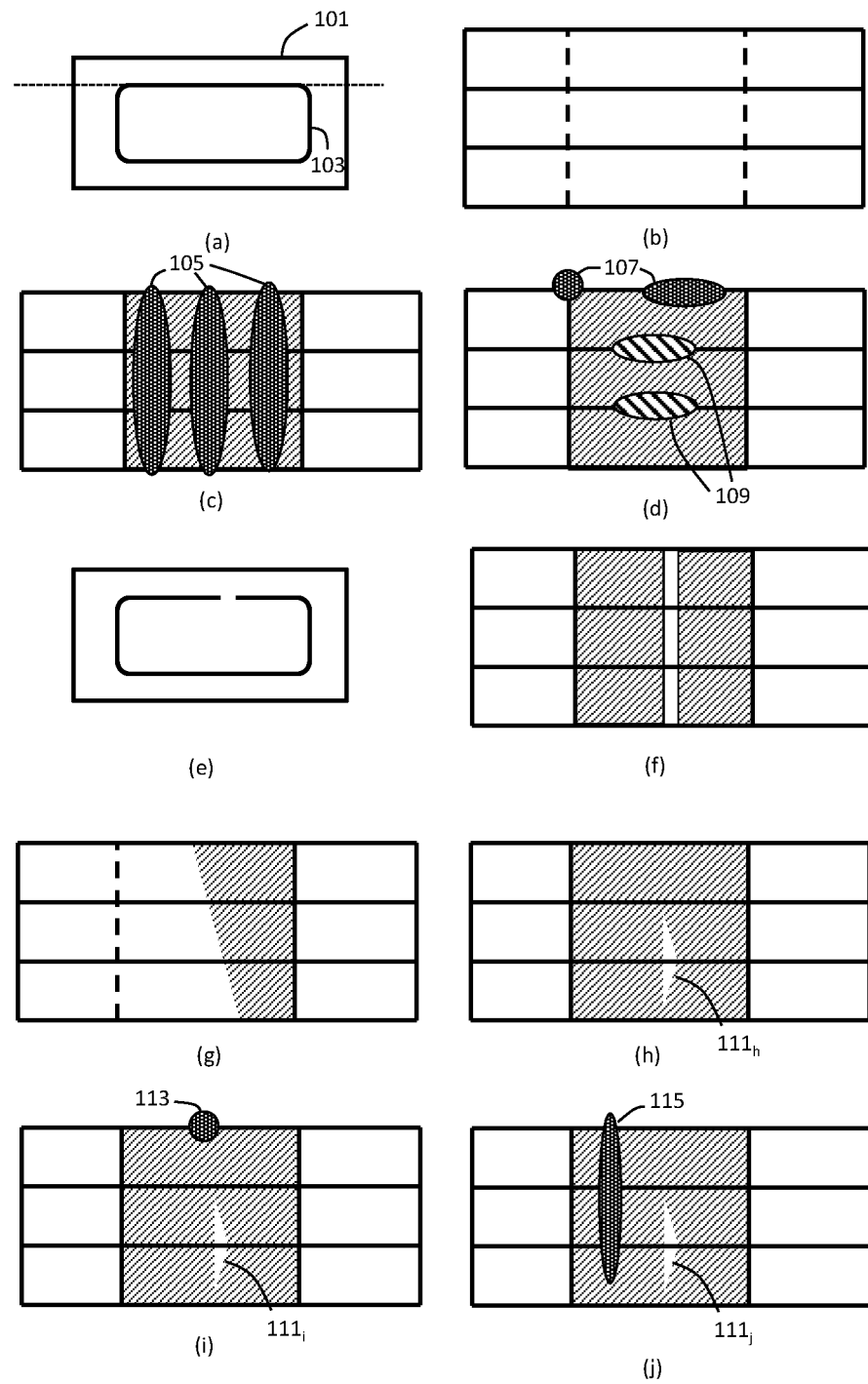
FIG. 4 is a diagram showing an example of a workpiece with supported cores provided by the overall wire electrical discharge machining device 7 or the rough-machining wire electrical discharge machining device 11 shown in FIG. 1.

Referring to FIG. 4, description will be made regarding an example of rough machining in a state in which a core is supported. For example, the first operation represents an operation as shown in FIGS. 4C and 4D in which machining is performed in a state in which a core is only bonded to the workpiece. The second operation represents an operation as shown in FIGS. 4E, 4F, 4H, 4I, and 4J in which machining is performed in a state in which a core is supported via an un-machined portion.

FIG. 4A shows an example of a combined workpiece 101 and a core 103 formed in electrical discharge machining. FIG. 4B shows a side view of the combined workpiece 101. FIG. 4C is a cross-sectional view taken along the dotted lines in FIG. 4A after the combined workpiece 101 is cut off by means of electrical discharge machining. In this drawing, the hatched area represents the cut portion of the core 103. In a case in which the combined workpiece 101 is cut off along all the entire circumference of the core 103, the core 103 falls from the combined workpiece 101 (see Patent document 1). Accordingly, by bonding the core to the workpiece via a bonding spot 105 using a technique such as the core stitch method (trademark), for example, this arrangement allows the core to be supported by the workpiece 101. It should be noted that, by tilting the wire, for example, this arrangement allows the cores to be bonded via the bonding spots 105 in the form of bands.

In a case in which the cores are supported by the uppermost work plate in the machining as shown in FIG. 4D, the two lower cores fall. In order to solve such a problem, the assembling unit 23 may bond these cores by means of an adhesive agent 109, and the uppermost core is bonded to the uppermost work plate in the machining. This allows the cores to be supported.

FIGS. 4E through 4J each show a case in which a core is supported by means of an un-machined portion. As shown in FIGS. 4E and 4F, the wire is set to have a vertical orientation, and a part of the portion to be cut off is not machined, thereby preventing the core from separating from the combined workpiece.

Also, as shown in FIG. 4G, machining can be performed with a tilted wire. Also, in FIG. 4H, the area $111_h$ represents the un-machined portion. In this case, such an un-machined portion is formed in each of the two lower work plates. In a case in which machining is performed with the tilted wire, this arrangement allows such an un-machined portion to be provided to one or otherwise multiple work plates including the lowermost work plate as shown in FIG. 4H. In this case, the cores of the upper work plates do not fall because the lower cores are fixed. It should be noted that all the cores including the upper cores may preferably be fixed giving consideration to the stability of the cores when the workpiece is transferred by means of the robot unit.

As shown in FIG. 4I, the upper-layer core may be bonded in addition to providing the un-machined portion $111_i$ in the machining. The un-machined portion may be provided to only the lowermost layer, for example. This allows the area that supports the cores to be reduced. In some cases, this arrangement has the potential for breakage of the wire due to the instability of the intermediate cores. In order to solve such a problem, in the example shown in FIG. 4I, the un-machined portion $111_i$ is provided over the lower two plates. Furthermore, in order to provide the un-machined portion $111_i$ with a small area, the un-machined portion $111_i$ is configured to have an approximately triangular shape. Also, such layers may be supported by bonding by means of an adhesion agent. Also, as shown in FIG. 4J, such layers may be supported by means of both bonding and the un-machined portion $111_j$ in the machining.

It should be noted that, with the examples shown in FIGS. 4C and 4D, this arrangement is capable of removing the cores in an internal space of the machining device or otherwise in an external space outside of the machining device. However, with the examples shown in FIGS. 4F, 4H, 4I, and 4J, an un-machined portion is provided. Accordingly, it can be understood that the cores are preferably removed in an external space outside of the machining device.

Referring to FIG. 2A, the machining device core removing unit 35 of the overall wire electrical discharge machining device 7 removes and collects the cores from the combined workpiece 37 after the rough machining. (Step STK3). The removal and collection of the cores by means of the machining device core removing unit 35 may be executed as described in Patent document 2, for example. That is to say, a striking unit is provided to the upper head portion, and a collecting unit such as a box is provided to the lower head portion. The cores are struck by the striking unit such that they are removed. The cores thus removed are collected and stored in the storage unit. The cores collected by the machining device core removing unit 35 may be collected by the robot unit 17 at the same time at which the combined workpiece 37 is to be collected. Otherwise, the cores thus removed may be collected at different timings.

The electrical discharge machining unit 31 performs finishing machining of the combined workpiece 37 after the cores are removed (Step STK4). Subsequently, the robot unit 17 collects the combined workpiece 37 thus subjected to the finishing machining, and transfers the combined workpiece 37 to the pallet detaching unit 9. A detaching unit 43 of the pallet detaching unit 9 detaches the jig from the combined workpiece, stores the jig in a temporary jig storage unit 47, and stocks the machined work plates in the machined work plate stock unit 45. The machined work plates thus stocked in the machined work plate stock unit 45 are subjected to the next-step processing (Step STK5). The jig stored in the temporary jig storage unit 47 is transferred to the pre-machining work plate/jig stock unit 21 of the pallet assembling unit 3 by means of the robot unit 17.

Referring to FIG. 2B, description will be made regarding an example of the operation using the rough-machining wire electrical discharge machining device 11, the core processing apparatus 13, and the finishing wire electrical discharge machining device 15. In this example, the rough-machining wire electrical discharge machining device 11 provides rough machining in a state in which the cores are supported. The core processing apparatus 13 removes and collects the cores. The finishing wire electrical discharge machining device provides the finishing wire electrical discharge machining.

The robot unit 17 mounts a given combined workpiece stocked in the pre-machining combined workpiece stock unit 25 of the stock unit 5 on an electrical discharge machining unit 65 of the rough-machining wire electrical discharge machining device 11 (Step STC1). A combined workpiece 69 included in the electrical discharge machining unit 65 is the combined workpiece thus mounted.

In the rough-machining wire electrical discharge machining device 11, a measurement unit 73 measures the position of the combined workpiece 37, and a correction unit corrects the position of the combined workpiece 37 or adjusts the machining operation of the electrical discharge machining unit 31 according to the measurement results with respect to the combined workpiece 37 in the same way as the measurement unit 41 and the correction unit 39.

A machining device core supporting unit 67 performs the second operation in which the cores are supported. This allows the electrical discharge machining unit 65 to perform rough machining of the combined workpiece 69 in a state in which the cores are supported (Step STC2).

The robot unit 17 collects the combined workpiece 69 with supported cores after the rough machining, and mounts the combined workpiece 69 on the core processing apparatus (Step STC3). The rough-machined combined workpiece 75 is the combined workpiece thus mounted after the rough machining.

A core removing unit 77 of the core processing apparatus 13 removes and collects the cores from the rough-machined combined workpiece 75 (Step STC4). The core removing unit 77 of the core processing apparatus 13 is a dedicated device for processing the cores. For example, a striking unit and a collecting unit may be provided for each position of the multiple cores. This allows a part of or otherwise all of the cores to be removed and collected at the same time by means of a single striking operation. Accordingly, this arrangement allows the core processing apparatus 13 to remove and collect all the cores in a short period of time. The cores collected by the core removing unit 77 may be collected by the robot unit 17 at the same time at which the rough-machined combined workpiece 75 is to be collected. Otherwise, the cores thus removed may be collected at different timings. The core processing apparatus may be mounted on the robot unit 17.

The robot unit 17 collects the rough-machined combined workpiece 75 after the cores are removed, and mounts the combined workpiece 75 on the finishing wire electrical discharge machining device 15 (Step STC5). An electrical discharge machining unit 81 performs finishing machining of the combined workpiece 37 after the cores are removed (Step STC6). Subsequently, the robot unit 17 collects the combined workpiece 83 after the finishing machining, and transfers the combined workpiece 83 to the pallet detaching unit 9. The detaching unit 43 of the pallet detaching unit 9 detaches the jig from the combined workpiece, stores the jig in the temporary jig storage unit 47, and stocks the machined work plates in the machined work plate stock unit 45. The machined work plates thus stocked in the machined work plate stock unit 45 are subjected to the next-step processing (Step STC7). The jig stored in the temporary jig storage unit 47 is transferred to the pre-machining work plate/jig stock unit 21 of the pallet assembling unit 3 by means of the robot unit 17.

It should be noted that, in the present invention, multiple overall wire electrical discharge machining devices 7, multiple rough-machining wire electrical discharge machining devices 11, multiple core processing apparatuses 13, or multiple finishing wire electrical discharge machining devices 15 may be provided. Also, in a case in which the multiple overall wire electrical discharge machining devices 7 are provided, this arrangement may support an operation in which a given overall wire electrical discharge machining device 7 operates as the rough-machining wire electrical discharge machining device without removing the cores. Also, the overall wire electrical discharge machining device 7 may perform a core removal operation so as to operate as the core processing apparatus 13. Also, the overall wire electrical discharge machining device 7 may operate as the finishing wire electrical discharge machining device 15 without performing the core removal operation. Also, a given rough-machining wire electrical discharge machining device 11 may perform finishing machining of a combined workpiece after the cores are removed, so as to operate as the finishing wire electrical discharge machining device 15.

With the wire electrical discharge machining device that is capable of performing the core processing operation, whether or not it operates as the overall wire electrical discharge machining device 7 or the rough-machining wire electrical discharge machining device 11 may be determined based on the operating state of the core processing apparatus 13 by means of a machining device control unit of each wire electrical discharge machining device or otherwise the robot control unit 53, for example. In this case, before the electrical discharge machining, the machining device control unit or otherwise the robot control unit may determine whether the core processing operation is to be performed by means of the wire electrical discharge machining device or otherwise the core processing apparatus 13. When determination is made that the core processing operation is to be performed by the wire electrical discharge machining device itself, machining is performed in a state in which the cores are supported by means of bonding alone as shown in FIGS. 4C and 4D. When determination is made that the core processing is to be performed by the core processing apparatus 13, machining is performed in a state in which the cores are supported by the pre-machining remaining portions as shown in FIGS. 4E, 4F, 4H, 4I, and 4J. Also, as shown in FIGS. 4C and 4D, after electrical discharge machining is performed in a state in which the cores are supported by means of bonding alone, the apparatus to be employed to perform the core processing operation may be determined.

Also, the pallet assembling operation and/or the pallet detaching operation may be omitted.

REFERENCE SIGNS LIST 1 wire electrical discharge machining system, 3 pallet assembling unit, 5 stock unit, 7 overall wire electrical discharge machining device, 9 pallet detaching unit, 11 rough-machining wire electrical discharge machining device, 13 core processing unit, 15 finishing wire electrical discharge machining device, 17 robot unit, 21 pre-machining work plate/jig stock unit, 23 assembling unit, 25 pre-machining combined workpiece stock unit, 27, 61, 79 machining device control unit, 29, 63 machining device core control unit, 31, 65, 81 electrical discharge machining unit, 33, 67 machining device core supporting unit, 35 machining device core removing unit, 37, 69, 83 combined workpiece, 39, 71, 85 correction unit, 41, 73, 87 measurement unit, 75 rough-machined combined workpiece, 77 core removing unit.

The invention claimed is:

1. A workpiece measurement method employed in a wire electrical discharge machining device configured to machine a workpiece,
    wherein the workpiece measurement method comprises:
        machining, using a wire, by means of an electrical discharge machining unit which the wire electrical discharge machining device comprises, a predetermined measurement portion on a measurement target that is a physically different piece from the workpiece;
        measuring one or a plurality of predetermined measurement points formed in the predetermined measurement portion by a position measurement unit which the wire electrical discharge machining device comprises, after the position measurement unit is extruded from a retracted position;
        correcting a measurement operation of the position measurement unit based on a result of the measurement of the one or the plurality of predetermined measurement points; and then
        measuring the workpiece, which is a physically different piece from the measurement target, by the position measurement unit in which the measurement operation is corrected; and
        correcting a position at which the workpiece is mounted or a position of the wire based on a result of the measurement of the workpiece.

2. The workpiece measurement method according to claim 1, wherein the measuring of the workpiece by the position measurement unit includes detecting a tilt of the workpiece and correcting the position at which the workpiece is mounted based on a result of the detection of the tilt.

3. The workpiece measurement method according to claim 2, further comprising,
    upon detecting that the tilt of the workpiece is smaller than a reference value, correcting a longitudinal axis of the wire such that the longitudinal axis of the wire is orthogonal to a reference plane of the workpiece.

4. The workpiece measurement method according to claim 3, wherein the electrical discharge machining unit machines the workpiece after correcting the position at which the workpiece is mounted or the longitudinal axis of the wire.

5. The workpiece measurement method according to claim 1, wherein the correcting of the measurement operation of the position measurement unit includes:
    at least one of estimating a position of the position measurement unit or calculating a position of the wire; and
    recalibrating at least one of the position of the position measurement unit or the position of the wire.

6. The workpiece measurement method according to claim 1, wherein the correcting of the measurement operation of the position measurement unit includes:
    estimating a position of the position measurement unit and calculating a position of the wire; and
    recalibrating the position of the position measurement unit and the position of the wire.

* * * * *